Nov. 11, 1958   M. E. ESTEY   2,859,993
VALVE STEM SEAL
Filed Oct. 10, 1956
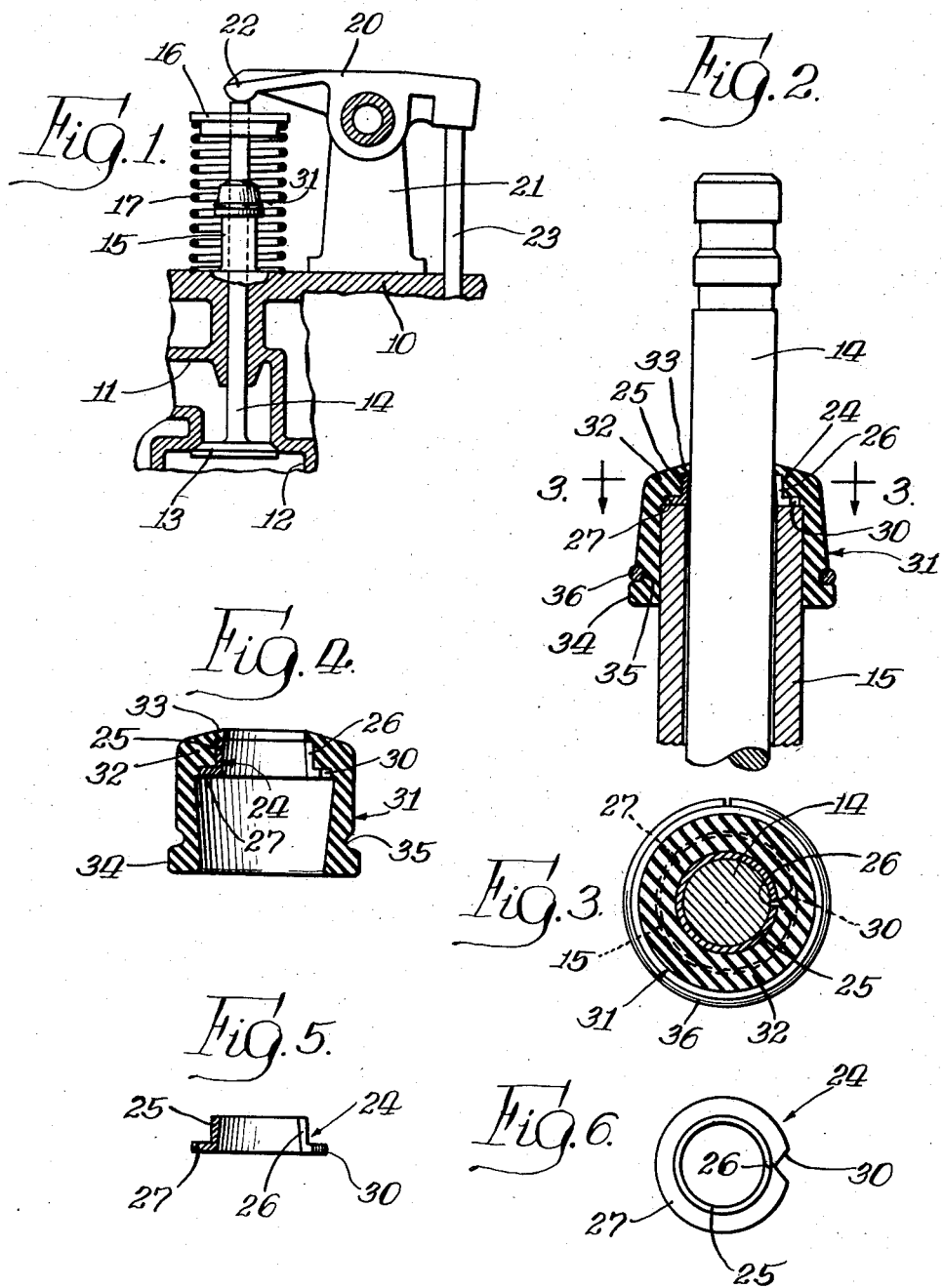
INVENTOR.
Melvin E. Estey,
BY
Davis, Lindsey, Hibben and Noyes
Atty's.

United States Patent Office 2,859,993
Patented Nov. 11, 1958

2,859,993

VALVE STEM SEAL

Melvin E. Estey, Hagerstown, Ind., assignor to Perfect Circle Corporation, Hagerstown, Ind., a corporation of Indiana Application October 10, 1956, Serial No. 615,179

5 Claims. (Cl. 288—9)

The invention relates generally to seals and more particularly to a valve stem seal.

In internal combustion engines, the intake and exhaust valves are cam operated through rocker arms in the case of an overhead valve engine or through plungers in the case of an L-head engine. Each valve comprises a valve head and a stem reciprocably mounted in a guide, with the end of the stem engaged by the rocker arm or plunger, as the case may be. The guide may be an integral part of the cylinder head or cylinder block, or may comprise a separate member fitted in the cylinder head or cylinder block. In the case of the overhead valve engine, oil is usually supplied through the rocker arm to the point of contact with the end of the valve stem, and the oil runs along the stem to lubricate the guide. As wear occurs in the guide or on the stem, the oil tends to work through the guide to the head of the valve where it may be drawn into the combustion chamber portion of the cylinder and head in the case of an intake valve, or will be contacted by the hot exhaust gases in the case of an exhaust valve. In either instance, the oil will be burned, causing smoke in the exhaust, as well as a waste of oil. Similar conditions will occur in the case of an L-head engine.

The general object of the present invention is to provide a novel seal for the stem of a valve to prevent excess oil from entering the valve stem guide.

More specifically, the object is to provide a novel valve stem seal which permits sufficient oil to pass therethrough to lubricate the guide but prevents an excess of oil from reaching the guide.

Another object is to provide a novel valve stem seal which is inexpensive to manufacture, may be easily installed, effectively prevents the passage of excess oil, and remains effective for a long period of time.

Other objects and advantages will become apparent from the following description taken in connection with the accompanying drawing, in which:

Fig. 1 is a fragmentary elevational view, partly in section, of a valve operating mechanism of an internal combustion engine, with the stem of the valve provided with a seal embodying the features of the invention;

Fig. 2 is an enlarged longitudinal sectional view of the seal illustrated in Fig. 1 and showing it mounted on a valve stem and valve stem guide;

Fig. 3 is a transverse sectional view of the seal taken on the line 3—3 of Fig. 2;

Fig. 4 is a view of the seal, similar to Fig. 2, but showing it before being mounted on the valve stem and guide;

Fig. 5 is a longitudinal sectional view of one of the parts of the seal; and

Fig. 6 is a plan view of the part shown in Fig. 5.

For purposes of illustration, I have shown a seal embodying the features of the invention, in connection with an engine of the overhead valve type. In Fig. 1 of the drawing, a fragmentary portion of such an engine is shown. Thus, the cylinder head of the engine is partially illustrated in section at 10. The head 10 is shown as being provided with a passage 11 communicating with the combustion chamber fragmentarily shown at 12, the opening of the passage 11 into the combustion chamber 12 being controlled by a valve comprising the usual valve head 13 formed on one end of a stem 14. The latter extends through the cylinder head 10 and is reciprocably supported by a guide 15, which in this instance is shown as being integral with the cylinder head. The guide 15, of course, may be of the character shown or may comprise a separate member rigidly secured in the cylinder head, as heretofore mentioned.

The valve stem 14 extends upwardly beyond the guide 15 at its upper end and is usually provided with a plate 16 engaged by one end of a coil spring 17, the other end of the spring being shown as seated on the cylinder head. The spring thus tends to move the valve head 13 to a closed position. For opening the valve, a rocker arm 20 is shown as rockably mounted on a bracket 21 extending upwardly from the cylinder head, with one end 22 engaging the upper end of the valve stem 14. To operate the rocker arm 20, the other end thereof is shown as engaged by a push rod 23 which is operated by engine-driven cam means (not shown). The valve described is illustrative of either an intake valve or an exhaust valve.

To lubricate the rocker arm, oil is usually supplied to the rocker support and a passage is provided in the rocker arm for conducting oil to the end 22 of the rocker arm to lubricate its contact with the upper end of the valve stem 14. The oil therefrom then runs downwardly on the stem and provides lubrication for the valve stem guide 15. If the guide 15 has an excess clearance with the valve stem or such excess clearance is present after wear, the oil will continue to travel downwardly on the valve stem 14 until it reaches the valve head 13. If the valve is an intake valve, the oil will be drawn into the combustion chamber and will be burned therein, resulting in smoke in the exhaust. If the valve is an exhaust valve, the hot gases discharged from the combustion space will effect burning of the oil and will likewise result in smoke in the exhaust.

A seal embodying the features of the invention is adapted to be mounted on the valve stem 14 at the upper end of the valve stem guide 15 and is constructed to prevent excess oil from running down the valve stem into the guide but permitting sufficient oil to pass therethrough to properly lubricate the guide and stem. Generally the seal comprises a split metal collar adapted to embrace the valve stem at the upper end of the guide, and a resilient cup-shaped member fitting over the collar and resiliently gripping the upper end portion of the guide to hold the collar in place.

As illustrated in the drawing, the seal is shown as comprising a metal collar indicated generally at 24. The collar 24 is preferably made of cast iron and comprises, in this instance, a tapered annular collar portion 25 which is split to form a gap as at 26 so that it hugs the valve stem 14 at its upper edge to scrape oil therefrom. The collar 24 also includes a flange 27 at the lower or larger end of the collar portion 25 adapted to seat against the end of the guide 15. In order to minimize the width of the gap at the split 26, the flange 27 is provided with a notch 30 and the collar portion 25 is then fractured to provide the split 26. The collar portion 25 is initially taper reamed and the inner diameter thereof at the upper or smaller end is slightly less than the diameter of the stem 14. The collar portion 25 is then fractured so that it can be expanded to be placed on the valve stem. The collar portion 25 at its upper end thus tightly hugs the stem while the lower end of the collar portion 25 stands clear of the stem.

The collar 24 is held in place at the end of the valve guide 15 by a resilient cup-shaped member indicated generally at 31, preferably made of rubber or rubber-like material such as neoprene. The cup-shaped member 31 is in an inverted position and comprises a centrally perforated transverse wall 32 in which the collar 24 is embedded. The wall 32 may be bonded to the collar 24 by vulcanizing or by an adhesive, or the collar 24 may be merely embraced by the wall 32 without any bonding. The wall 32 preferably extends above the collar 24 to provide a portion gripping the valve stem 14, as 33, which eliminates any space above the collar 24 where a pool of oil might form around the stem.

The cup-shaped member 31 is adapted to fit over and grip the upper end of the guide 15, and to this end, it is molded with an interior taper as shown in Fig. 4. Thus, the lower or open end of the member has an initial diameter somewhat less than the diameter of the guide 15 so that it must be stretched when placed on the valve guide 15. It thus hugs the valve guide tightly and will be retained thereon. The taper of the cup-shaped member results in a thickening of the wall thereof toward the lower end to enhance the gripping action thereof. The lower end of the member 31 may also be provided with an annular external rib 34 at its lower end to assist in the gripping action. As a further means for effecting a tight gripping action, the cup-shaped member may be provided with an external groove 35 adjacent the rib 34 to receive a metal snap ring 36 firmly holding the member 31 on the guide 15.

The split collar 24 is thus held on the valve stem 14 adjacent the upper end of the guide 15 and is prevented from reciprocating with the valve stem. The collar 24 will scrape off any excess oil running down the stem, although a film of oil will remain on the stem, sufficient to properly lubricate the guide 15. The excess oil, however, is prevented from reaching the valve head 13.

I claim:

1. A valve stem seal adapted to be mounted on a valve stem guide, comprising a resiliently contracting collar having a generally cylindrical portion adapted to embrace and hug the valve stem and having a flange at its inner end, and a resilient cup-shaped member having its transverse wall perforated and embracing said cylindrical portion and its side wall adapted to resiliently embrace the end portion of the guide, said transverse wall overlying said flange to hold the collar against movement with the valve stem longitudinally thereof.

2. A valve stem seal according to claim 1, in which said transverse wall is of sufficient thickness to extend beyond said collar and of such diameter as to hug the stem at the outer end of the collar to prevent the formation of a pool of oil at said outer end.

3. A valve stem seal according to claim 1, in which said collar is made of metal and said flange has a radially extending notch and the collar is longitudinally fractured from said notch to provide a split with irregular surfaces.

4. A valve stem seal according to claim 1, in which said cup-shaped member is normally internally tapered with its open end of smaller internal diameter than its closed end and said member is adapted to be stretched when mounted on the guide.

5. A valve stem seal according to claim 1, in which said cylindrical portion of said collar is internally tapered with its internal diameter at its outer end slightly less than the diameter of the valve stem and adapted to be spread to snugly embrace the valve stem, the internal diameter of the inner end of said portion being larger and being adapted to be slightly spaced from the stem and to be located at the end of the guide, the smaller end of said portion thereby being adapted to engage the stem at a point spaced from the end of the guide.

References Cited in the file of this patent

UNITED STATES PATENTS

| 1,482,478 | Milligan | Feb. 5, 1924 |
| 1,507,567 | Aschenbach | Sept. 9, 1924 |
| 2,630,357 | Smith | Mar. 3, 1953 |

FOREIGN PATENTS

| 543 | Great Britain | Feb. 27, 1867 |
| 334,675 | Great Britain | Sept. 11, 1930 |